United States Patent
Berard

(10) Patent No.: US 10,677,358 B2
(45) Date of Patent: Jun. 9, 2020

(54) BLOW OUT RESISTANT SEAL AND ASSEMBLY

(71) Applicant: Eaton Corporation, Cleveland, OH (US)

(72) Inventor: Gerald M. Berard, North Providence, RI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/551,184

(22) PCT Filed: Feb. 17, 2016

(86) PCT No.: PCT/US2016/018159
§ 371 (c)(1),
(2) Date: Aug. 15, 2017

(87) PCT Pub. No.: WO2016/133954
PCT Pub. Date: Aug. 25, 2016

(65) Prior Publication Data
US 2018/0031130 A1    Feb. 1, 2018

Related U.S. Application Data

(60) Provisional application No. 62/117,538, filed on Feb. 18, 2015.

(51) Int. Cl.
*F16J 15/34* (2006.01)
*F16J 15/36* (2006.01)
(Continued)

(52) U.S. Cl.
CPC ................ *F16J 15/36* (2013.01); *F16J 3/04* (2013.01); *F16J 15/164* (2013.01); *F16J 15/34* (2013.01);
(Continued)

(58) Field of Classification Search
CPC .. F16J 15/36; F16J 15/164; F16J 15/34; F16J 15/3452; F16J 15/3496; F16J 3/04
See application file for complete search history.

(56) References Cited

U.S. PATENT DOCUMENTS 2,815,967 A * 12/1957 Payne ...................... F16J 15/36
277/315
3,895,811 A    7/1975 Richard, Jr. et al.
(Continued)

FOREIGN PATENT DOCUMENTS

EP             345944 A2 *  5/1989
GB             773663 A  *  5/1957  ............... F16J 15/36

OTHER PUBLICATIONS

International Search Report, PCT/US2016/018159, dated May 9, 2016.

*Primary Examiner* — Gilbert Y Lee
(74) *Attorney, Agent, or Firm* — Fishman Stewart PLLC

(57) ABSTRACT

A seal assembly (10) includes a seal ring shell (12) and an insert (14). The seal ring shell includes an inside diameter surface, and may also include a seal ring shell tapered portion that extends radially inwardly from the inside diameter surface. The insert includes an upper surface, and may also include an insert tapered portion. With embodiments, a portion of the upper surface of the insert contacts or operatively engages the inside diameter surface of the seal ring shell, and a portion of the insert tapered portion engages the seal ring shell tapered portion such that the seal ring shell tapered portion may impede movement of the insert in a direction substantially along the inside diameter surface (e.g., in an axial direction).

15 Claims, 4 Drawing Sheets

(51) Int. Cl.
 *F16J 3/04* (2006.01)
 *F16J 15/16* (2006.01)
(52) U.S. Cl.
 CPC ....... *F16J 15/3452* (2013.01); *F16J 15/3496* (2013.01)

(56) References Cited

U.S. PATENT DOCUMENTS 4,042,847 A 8/1977 Jensen
4,175,753 A 11/1979 Wentworth, Jr.
2007/0210526 A1 9/2007 Basu et al.

* cited by examiner

BLOW OUT RESISTANT SEAL AND ASSEMBLY

CROSS-REFERENCE TO RELATED APPLICATIONS

This application claims priority to International Patent Application No. PCT/US2016/018159, filed Feb. 17, 2016, which claims the benefit to U.S. Provisional Application Ser. No. 62/117,538, filed Feb. 18, 2015, the contents of both are incorporated by reference in their entireties.

TECHNICAL FIELD

The present disclosure relates generally to composite type seals and sealing systems, including bellows seal composite sealing assemblies.

BACKGROUND

Conventional composite bellows seal assemblies are often configured to include an insert, such as a carbon graphite insert, that is pressed or shrunk into a front seal ring shell cavity. With some applications, an epoxy or bonding agent is added to the back wall interface of the shell and insert to help prevent system fluid pressure unfavorably encroaching upon and affecting the interface. In some conventional designs, aside from a bonding agent and/or friction between components, there may be no additional mechanical features to restrain an insert from blowing out during a high-pressure condition.

Moreover, it can be challenging if the back wall of the insert becomes pressurized with, or subject to, significant system pressure. That is, if the system pressure invades the interface at too significant a level, there can be an increased possibility that the pressure will work to urge the insert out of the shell which, in some instances, could result in a blow out of the insert and possibly even sealing system failure. If an insert is solely press fit, without bonding, a tremendous amount of interference or friction can be needed to hold it in place in operation.

Additionally, it can also be desirable to provide assemblies with an overall reduction in weight. With dynamic operation contemplated, a seal ring assembly seal face may be designed to be in contact with, or in close proximity to, a rotating rotor, even during slight axial excursions or run out—commonly referred to as "tracking." With tracking, it can be desirable for there to be a reduction in mass, as a reduction in mass can lead to better stability and component tracking. Therefore, among other things, it can be desirable to provide a seal and assembly with a reduction in weight/mass.

Among other things, it can be a challenge to provide improved seals and sealing assemblies that address some or all of the aforementioned challenges.

SUMMARY

A seal and seal assembly are disclosed. A seal assembly includes a seal ring shell and an insert. The seal ring shell includes an inside diameter surface and a seal ring shell tapered portion that extends radially inwardly from the inside diameter surface. The insert includes an upper surface and an insert tapered portion. With embodiments, a portion of the upper surface of the insert engages the inside diameter surface of the seal ring shell, and a portion of the insert tapered portion engages the seal ring shell tapered portion such that the seal ring shell tapered portion may restrict movement of the insert in a direction substantially along the inside diameter surface (e.g., in an axial direction).

In embodiments, a bonding element may be disposed between the seal ring shell and the insert. The bonding element may be disposed between the inside diameter surface of the seal ring shell and the upper surface of the insert. The bonding element may include room temperature vulcanized silicon rubber. In embodiments, the seal ring insert may be configured for use with pressures of at least 250 psid. The seal ring shell may include a shoulder portion configured to restrict movement of the insert in a second axial direction. The shoulder portion may extend radially inward from the inside diameter surface. An overhang length of the shoulder may be between about 0.01 and 0.06 times a radial extent of the insert. The shoulder portion may include a second seal ring shell tapered portion. The insert may include a second tapered portion that corresponds to the second seal ring shell tapered portion.

In embodiments, the seal ring assembly may include a bellows connected to the seal ring shell. The bellows may include an edge welded bellows. The bellows may be connected to the seal ring shell via welding. In embodiments, the seal ring shell may comprise a single, unitary component. The insert may include a sealing surface configured for a sealing engagement with a hydrodynamic rotor. In embodiments, the insert may comprise carbon graphite.

A method of sealing is disclosed. The method may include providing a seal assembly. The seal ring assembly may comprise a seal ring shell including an inside diameter surface and a seal ring shell tapered portion that extends radially inwardly from the inside diameter surface, and an insert including an upper surface and an insert tapered portion. The method may include applying a system pressure to the seal assembly and restricting movement of the insert in a first axial direction via the insert tapered portion operatively engaging the seal ring shell tapered portion. The seal ring shell may include a shoulder portion and/or a shoulder tapered portion. The insert may include a second tapered portion. The method may include restricting movement of the insert in a second axial direction via the second tapered portion of the insert operatively engaging the shoulder tapered portion. The first axial direction may be substantially opposite of the second axial direction. The system pressure may be at least 250 psid and the insert may not blow out of the seal ring shell. The seal ring shell may be a single, unitary component.

Various aspects of the present disclosure will become apparent to those skilled in the art from the following detailed description of the various embodiments, when read in light of the accompanying drawings.

BRIEF DESCRIPTION OF THE DRAWINGS

Embodiments of the present disclosure will now be described, by way of example, with reference to the accompanying drawings.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
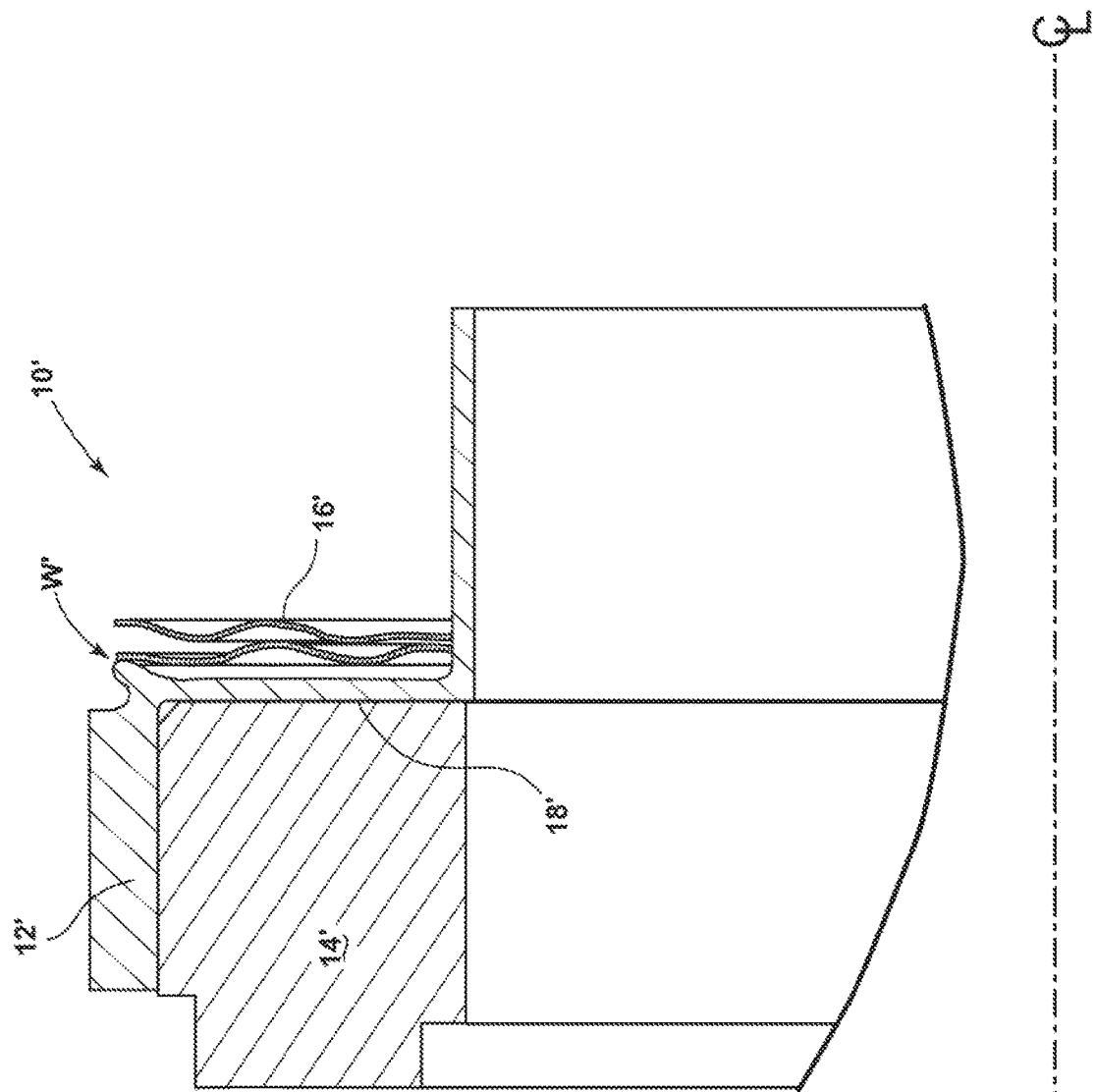
FIG. 1 is a cross-sectional side view of a seal assembly with conventional features.

Referring now to FIG. 1, a bellows seal assembly 10' with conventional features is illustrated. The seal assembly 10' includes a seal ring shell 12' and an insert 14'. Bellows 16' are generically depicted to the right side of the seal ring shell 12' (opposite the insert 14'). A weld W' associated with the bellows 16' and seal ring shell 12' is generally depicted. As generally illustrated, a bond 18' may be provided on a surface interface (e.g., a back wall interface) between the seal ring shell 12' and the insert 14'. The bond 18' may comprise a segment of an epoxy or bonding agent that is provided in a portion of the interface of the seal ring shell 12' and insert 14'.

Figure 2:
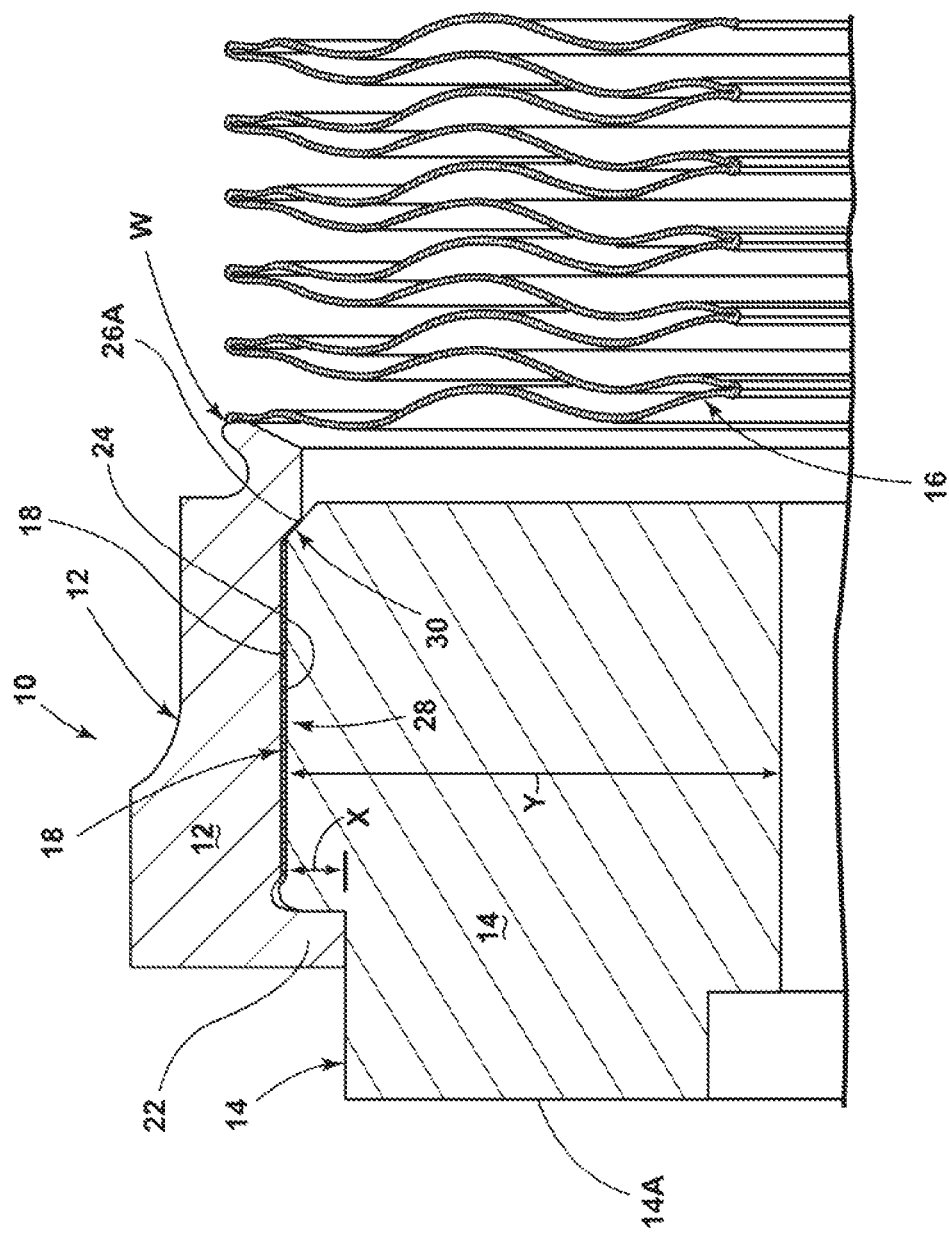
FIG. 2 is a cross-sectional side view of an embodiment of a seal assembly illustrating features of the present disclosure.

Turning to FIG. 2, an embodiment of a seal assembly illustrating features of the present disclosure is generally illustrated. The seal assembly 10 includes a seal ring shell 12 and an insert 14. The insert 14 may, for example and without limitation, comprise a carbon graphite insert. However, the insert 14 may be comprised of other suitable materials known in the art. Insert 14 may include a sealing surface 14A that may be configured for a sealing engagement with a rotor (e.g., a hydrodynamic grooved rotor).

In the illustrated embodiment, bellows 16 are depicted to the right (aft) side of the seal ring shell 12 (i.e., opposite the insert 14 provided depicted on the left (forward) side). A weld W associated with the bellows 16 and seal ring shell 12 is generally shown. However, those of skill in the art will readily appreciate that the disclosed concept is not limited to the use of, or precise position of, a weld or other operative connection between the bellows 16 and the seal ring shell 12.

As generally illustrated, the seal ring shell 12 may include a shoulder portion 22, an inside diameter surface 24, and/or a seal ring shell tapered portion 26A. The inside diameter surface 24 of the seal ring shell 12 may, for example as shown, extend along a significant portion of an upper surface of an insert 14. When included, a shoulder portion 22 on an inside diameter of the seal ring shell 12 can extend down around and/or over at least a portion of the insert 14—e.g., serving as a lip or impediment to movement in the axial direction. A shoulder portion 22 can be configured to effectively prevent an insert 14 from being pushed out (blown out) by reasonably anticipated pneumatic forces. In embodiments, the distance of the overhang of the shoulder portion 22 over the insert 14, may generally be designated as depicted as "X". The total distance of the insert (in the radial direction), which may also be referred to as the "maximum radial distance of the insert," may generally be designated as "Y" (see, e.g., FIG. 2). In embodiments, distance/dimension X may be at least 0.05 times distance/dimension Y. In other embodiments, distance/dimension X may be at least 0.10 times distance/dimension Y. In yet other embodiments, distance/dimension X may be at least 0.11 times distance/dimension Y. Moreover, for other embodiments, the X/Y ratio (which may be said to generally equate to the ratio of the length of a "lip" or overhang of the shoulder portion 22 over a portion of the insert 14 to the total vertical length of the insert 14) may be between 0.01 and 0.06. However, for some embodiments an X/Y ratio of more than 0.01 may provide acceptable functionality for the assembly. In embodiments, shell 12 may be configured as a single, unitary component.

Also as generally illustrated in FIG. 2, an insert 14 may include an upper surface, generally designated 28, and an insert tapered portion 30. In embodiments, the insert tapered portion 30 may substantially mirror or interface with a corresponding seal ring shell tapered portion (element 26A in FIG. 2). The inclusion of tapered portions (which may include or also be referred to herein as chamfered portions)—both on the insert 14 and the seal ring shell 12 (e.g., at an upper, aft-side end of the insert-seal ring shell interface) can, among other things help prevent an insert from blowing out in the "other" (aft) direction—for example, during start-up or in instances in which system pressure SP may be reversed. In some embodiments, of the disclosed assembly, the inclusion of the foregoing tapered portions (in the depicted upper-right interface) can make the insert resistant to blow out at pressures of up to 250 psid or greater, which can be up to three times or more of a common blowout limit of 80 psid.

Figure 3:
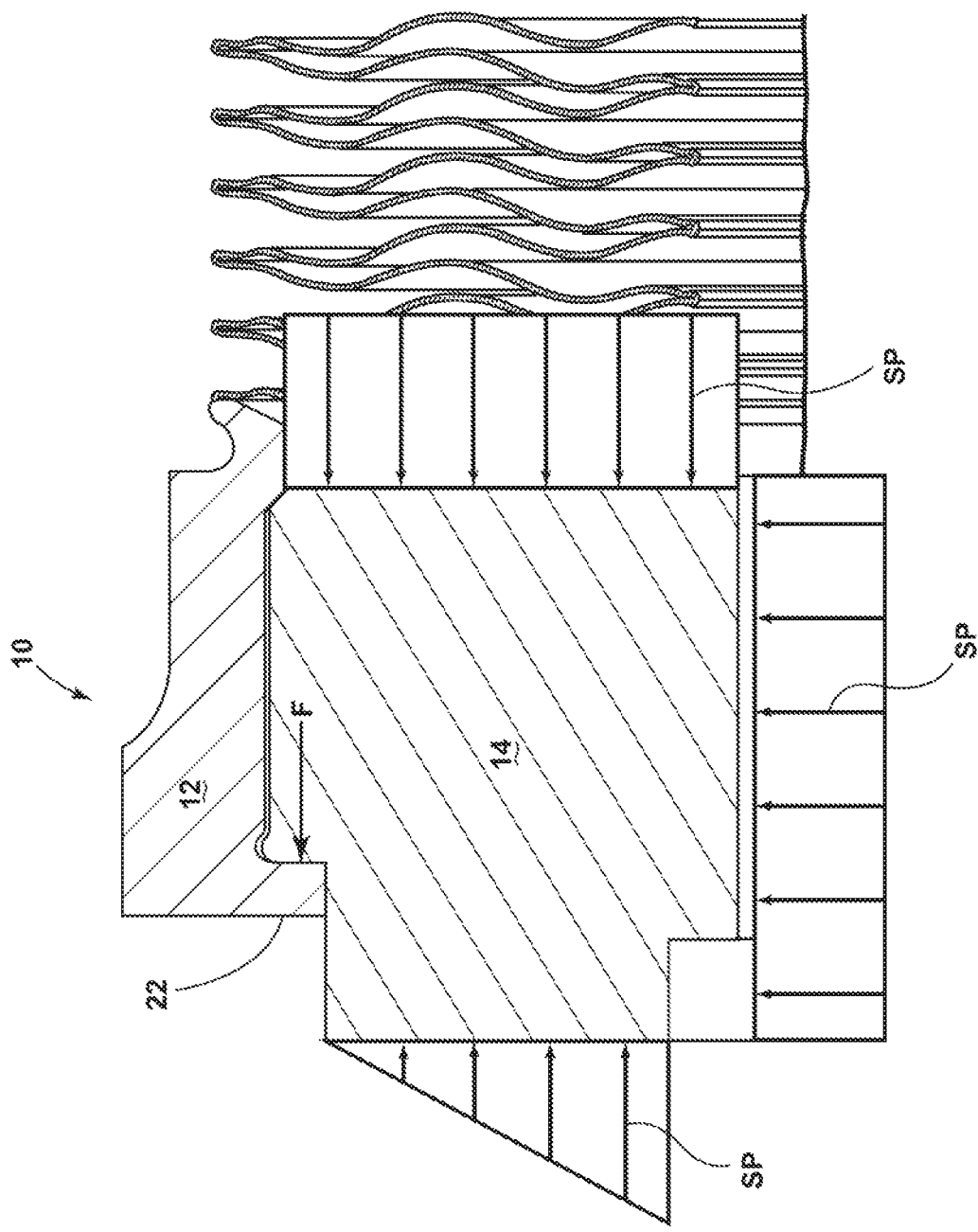
FIG. 3 is a cross-sectional side view of an embodiment of a seal assembly illustrating pressure distributions.

FIG. 3 illustrates a system pressure SP distribution on a configuration such as shown in FIG. 2. As generally represented, a net or resultant force F from system pressure SP may be directed toward the illustrated shoulder portion 22. Consequently, in contrast with certain conventional designs, the disclosed assembly 10 does not need to rely on just press fitting and/or bonding to maintain an axial positioning of the insert 14. However, that is not to say that embodiments of the present disclosure cannot also involve press fitting and/or bonding. Rather, embodiments may also involve variations of either or both techniques.

For example and without limitation, embodiments of the disclosed assembly 10 may optionally include a bond along all or portions of the surface interface between the seal ring shell 12 and the insert 14. That is, the relevant surface interfaces for the inclusion of a bonding element between the seal ring shell 12 and insert 14 may be included on a back wall surface interface (e.g., such as generally pointed out in connection with bond 18' shown in FIG. 1) and/or on an upper, substantially horizontal surface interface (e.g., such as generally pointed out in connection with bond 18 in FIG. 2). The bond may comprise a segment of various acceptable epoxy or bonding agent/material known in the art. The additional inclusion of a bond can, among other things, help to fill gaps and impart seals across a seal ring shell-insert interface. In some instances, a bond might for instance be formed from RTV (room temperature vulcanized) silicon rubber and may serve as a form of "caulk" to help prevent minor leaks across an interface.

Figure 4:
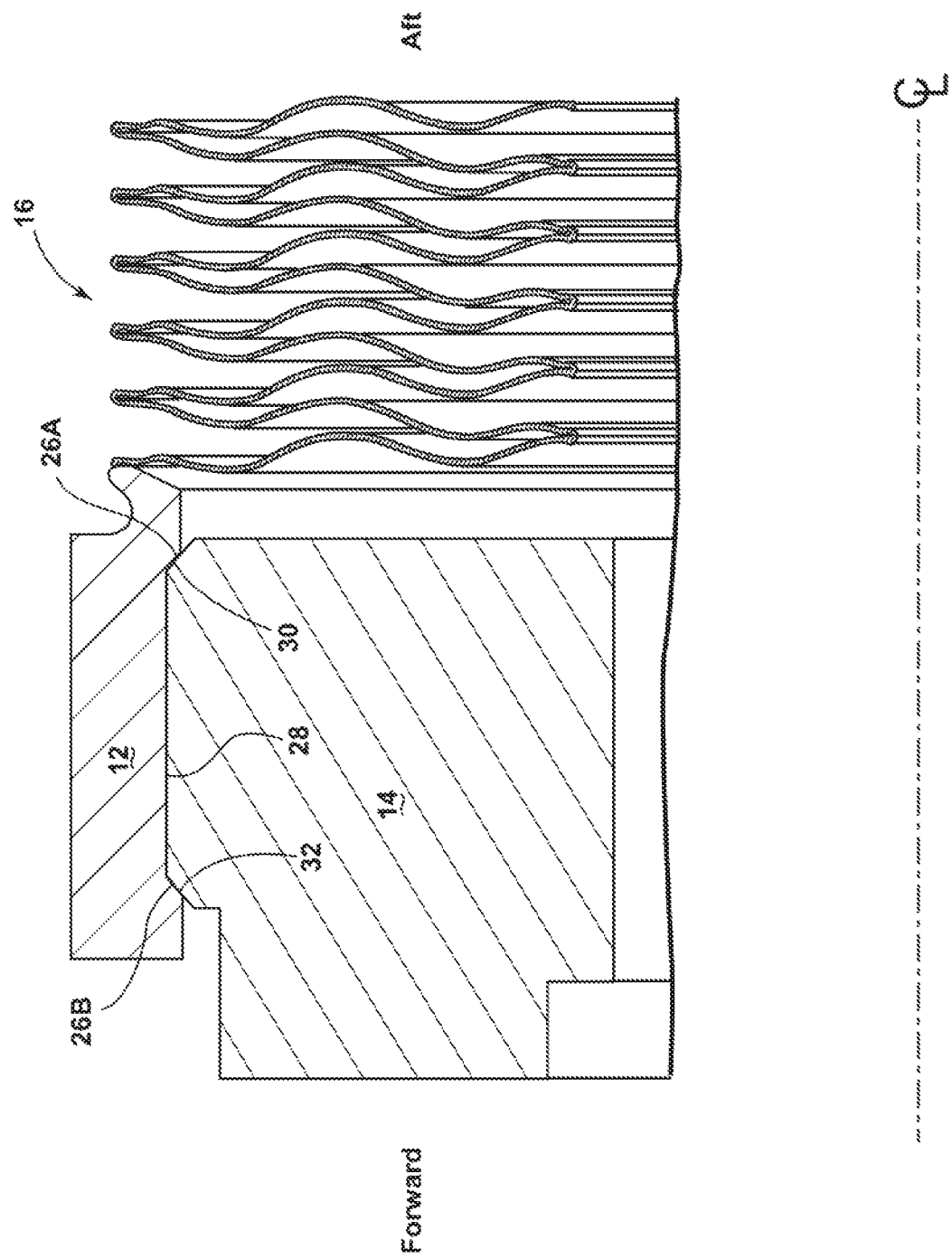
FIG. 4 is a cross-sectional side view of another embodiment of a seal assembly illustrating features of the present disclosure.

FIG. 4 generally illustrates an embodiment in which an insert tapered portion 30, 32 is included on each of two ends of an upper surface 28 of an insert 14. Each of the illustrated insert tapered portions 30, 32 may generally correspond to a tapered portion (e.g., tapered portions 26A, 26B) formed in proximity in the adjacent seal ring shell 12 (when the components are assembled). In embodiments, and as generally illustrated in FIG. 4, tapered portion 26B of seal ring shell 12 may be disposed at or about the position of the insert tapered portion 32, and such corresponding tapered portion of the seal ring shell 12 may have at least a portion of the tapered portion 26B formed by the shoulder portion, and may be referred to herein as shoulder tapered portion 26B.

It is noted that with embodiments of the disclosed concepts, and loading (e.g., right-to-left) on the back end of the assembly, it may be less of a concern if a pressure is present in the interface, as the assembly does not rely solely on, or as extensively on, a press fit of the insert and the seal ring shell. Moreover, as embodiments of the disclosed assembly can provide reduced mass and improved tracking, the weight of the disclosed assembly can be reduced by up to 70% or more, yet provide similar operational characteristics with respect to comparable conventional assemblies.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed is:

1. A seal assembly comprising:
    a metal seal ring shell including an inside diameter surface and a shoulder portion; and
    an insert including an upper surface;
    wherein a portion of the inside diameter surface of the seal ring shell contacts or engages a portion of the upper surface of the insert; a portion of the shoulder portion extends radially inward or downward from the inside diameter surface and around or over a portion of the insert; the portion of the shoulder portion is configured to impede movement of the insert in an axial direction relative to the seal ring shell; and the seal ring shell is configured as a single, unitary component formed from a single piece of material;
    wherein the seal ring shell includes a seal ring shell tapered portion at an axial end of the inside diameter surface opposite the shoulder portion, and the insert includes a first insert tapered portion at a first axial end of the upper surface, the seal ring shell tapered portion being configured to contact or operatively engage the first insert tapered portion.

2. The seal assembly of claim 1, wherein the portion of the shoulder portion overhangs the portion of the insert by a radial distance.

3. The seal assembly of claim 2, wherein the radial distance is at least about 0.01 times a total radial distance of the insert.

4. The seal assembly of claim 2, wherein the radial distance is at least about 0.11 times a total radial distance of the insert.

5. The seal assembly of claim 2, wherein the radial distance is between about 0.01 and about 0.06 times a total radial distance of the insert.

6. The seal assembly of claim 1, wherein the insert includes second insert tapered portion at a second axial end of the upper surface opposite the first axial end.

7. The seal assembly of claim 6, wherein the seal ring shell includes a shoulder tapered portion configured to contact or operatively engage the second insert tapered portion.

8. The seal assembly of claim 1, including a bonding element disposed between the seal ring shell and the insert.

9. The seal assembly of claim 8, wherein the bonding element comprises vulcanized silicon rubber.

10. The seal assembly of claim 1, including a metal bellows connected to the seal ring shell.

11. The seal assembly of claim 10, wherein a portion of the bellows is welded to a portion of the seal ring shell.

12. The seal assembly of claim 1, wherein the insert comprises carbon graphite.

13. A seal assembly comprising:
    a metal seal ring shell including an inside diameter surface and a seal ring shell tapered portion tapering in an axial direction and extending radially inwardly from the inside diameter surface; and
    an insert including an upper surface and an insert tapered portion tapering in the axial direction,
    wherein a portion of the upper surface of the insert operatively engages the inside diameter surface of the seal ring shell, and a portion of the insert tapered portion operatively engages the seal ring shell tapered portion; the seal ring shell tapered portion is configured to restrict movement of the insert in an axial direction; and the seal ring shell is configured as a single, unitary component formed from a single piece of material.

14. The seal assembly of claim 13, wherein the seal ring shell includes a shoulder portion that extends radially inward or downward and is configured to restrict movement of the insert in an axial direction.

15. A metal seal ring shell configured for engagement with an insert in a seal assembly, the metal seal ring shell comprising:
    a shoulder portion;
    an inside diameter surface; and
    a seal ring shell tapered portion at an axial end of the inside diameter surface opposite the shoulder portion and tapering in an axial direction;
    wherein the inside diameter surface is configured to extend along a significant portion of an upper surface of said insert; the shoulder portion is configured to extend down below the inside diameter surface and around or over at least a portion of said insert to provide a lip or impediment to movement of said insert in an axial direction; the seal ring shell tapered portion is configured to contact or operatively engage an upper surface portion of said insert; and the seal ring shell is configured as a single, unitary component formed from a single piece of material.

* * * * *